United States Patent [19] [11] 4,116,080
Berens [45] Sep. 26, 1978

[54] CONE PULLEY ARRANGEMENT

[75] Inventor: Heinrich Berens, Bad Homburg von der Hohe, Fed. Rep. of Germany

[73] Assignee: P.I.V. Antrieb Werner Reimers Kommanditgesellschaft, Fed. Rep. of Germany

[21] Appl. No.: 720,511

[22] Filed: Sep. 3, 1976

[30] Foreign Application Priority Data

Sep. 3, 1975 [DE] Fed. Rep. of Germany ....... 2539094

[51] Int. Cl.² ............................................. F16H 55/52
[52] U.S. Cl. ....................... 74/230.17 A; 74/230.17 M
[58] Field of Search ................. 74/230.17 A, 230.17 M

[56] References Cited

U.S. PATENT DOCUMENTS

| 2,678,566 | 5/1954 | Oehrli | 74/230.17 M |
| 3,365,967 | 1/1968 | Moogk | 74/230.17 A |
| 3,490,301 | 1/1970 | Steuer | 74/230.17 A |
| 3,590,649 | 7/1971 | Fischer | 74/230.17 A |
| 3,786,688 | 1/1974 | Svenson | 74/230.17 M |
| 3,975,964 | 8/1976 | Adams | 74/230.17 A |

Primary Examiner—Leonard H. Gerin
Attorney, Agent, or Firm—Craig & Antonelli

[57] ABSTRACT

An infinitely variable cone-pulley transmission arrangement which includes an input shaft, a drive output shaft and at least a pair of cone-pulleys arranged on each shaft with a transmission element circulating between the respective pairs of pulleys. At least one cone-pulley on each shaft is mounted for axial displacement relative thereto in response to the movement of a transmission ratio setting member. A rotary connection is provided at at least one of the cone-pulleys for generating a torque-dependent and ratio-dependent pressing forces between the cone-pulleys and the transmission element. The rotary connection includes a presser device having a plurality of pairs of spaced oblique faces of variable gradient which lie peripherally opposite one another with rolling elements being interposed between each of the pair of oblique faces. An axially mounted support ring is arranged on the shaft with the rolling means being supported at least indirectly against an adjacent cone-pulley and the support rings. The pairs of oblique faces include channels arranged at the shaft which extend substantially parallel to the axis of the shaft with the channels having an effective oblique face gradient which is modified over the channel length. The rolling elements are arranged in the channels so as to be displaceable along the axis of the shaft over the entire transmission ratio. An abutment face is provided on at least one of the support ring and the adjacent cone pulley facing the respective channels or engaging the rolling means.

43 Claims, 15 Drawing Figures

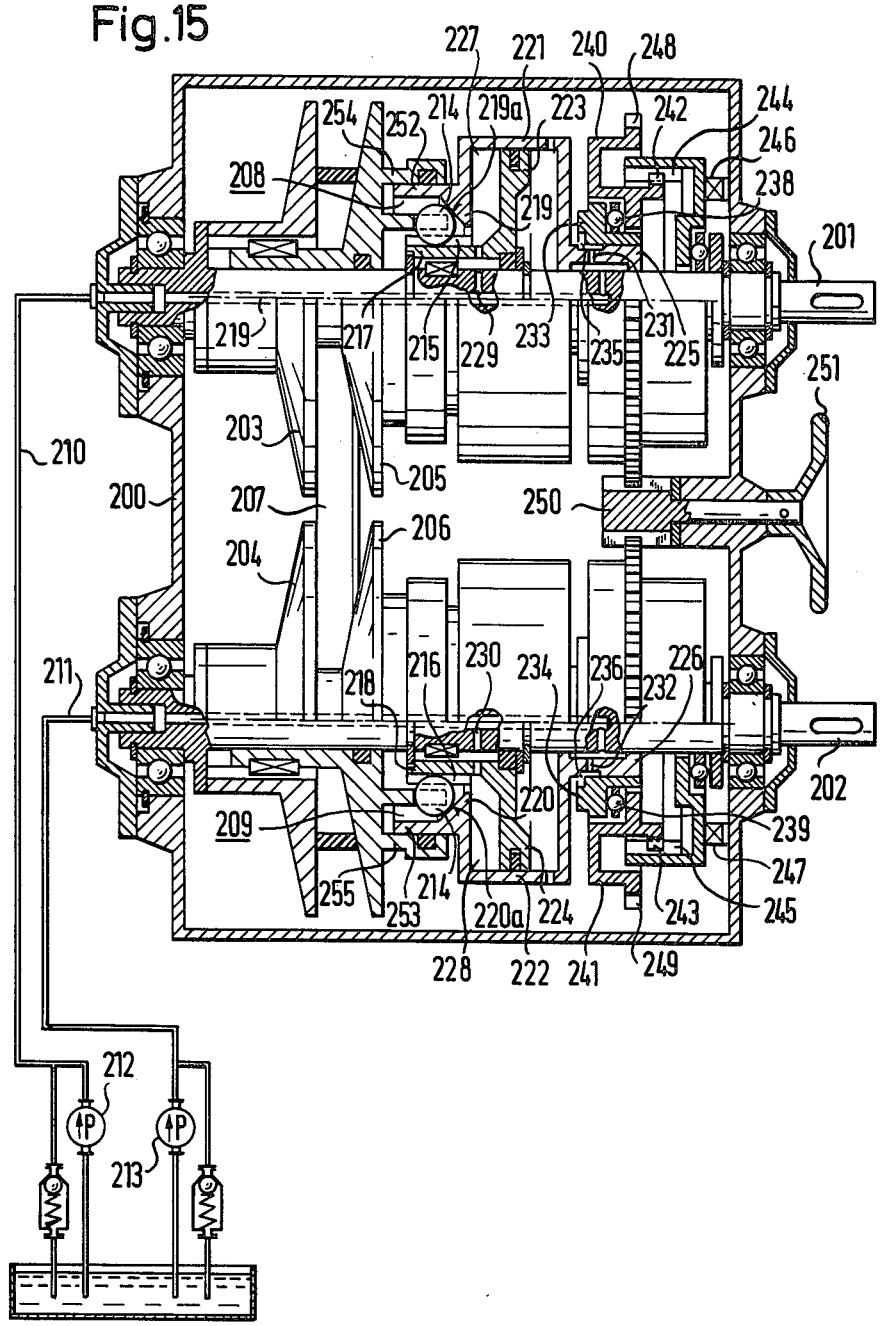

CONE PULLEY ARRANGEMENT

The present invention relates to a transmission arrangement and, more particularly, to an infinitely variable cone pulley transmission having at least two cone pulleys arranged on each of a drive input shaft and a drive output shaft with a transmission means being arranged for circulation between the respective pairs of cone pulleys.

Transmission arrangements have been proposed wherein at least one cone pulley on each transmission shaft is axially displaceable and is supported in the axial direction against a transmission ratio setting member with a rotational connection between at least one cone pulley pair with its associated shaft being formed as rotation-accompanying presser device for the generation of torque dependent and ratio dependent pressing forces between cone pulleys and transmission means. The presser device includes oblique faces of variable gradient and rolling bodies in the form of balls cooperating therewith.

In such proposed transmission arrangements, the transmission means may be fashioned as a smooth belt or as a chain provided with one or more friction bodies; however, it is also possible to provide a smooth ring for connecting two pairs of friction pulleys arranged on the input and output shafts.

It has been proposed to mount all of the cone pulleys so as to be axially displaceable and supported against the transmission setting members which are fashioned as control levers divided into coacting pairs and arranged on both sides of the drive input and drive output shafts.

Likewise, in a conventional hydraulically supported cone pulley transmission, it has been proposed to communicate the cone pulleys with a cylinder piston assembly or fashion the pulleys to form a cylinder piston assembly with a pressure medium, drawn from a pressure medium source, being allocated through a control slide valve, which valve, for the adjustment and maintenance of the transmission ratio, is articulated to an axially displaceable cone pulley and, for example, to a handle for setting the desired transmission ratio.

In many instances, it is sufficient to arrange the presser device only on one of the transmission shafts. One much instance exists when only a reversal of the direction of rotation of the transmission is to be effected, but not a reversal of the torque conducted through the transmission; i.e., no exchange of drive input and drive output sides. If only one presser device is provided, such device may be arranged at either the drive input or drive output side.

However, if the cone pulley transmission is to be utilized in situations wherein a reversal of direction of rotation and a reversal of torque is expected; i.e., an exchange between drive input and drive output, then the presser devices are arranged on both transmission shafts, with both presser devices being designed and dimensioned as presser device on the output side of the transmission.

In the proposed presser devices, the oblique faces are formed as screw faces, the ratios of which, as a rule, are such that at minimum running radius of the transmission means on the shaft carrying the presser device, a portion of the screw faces having the flatest gradient in comparison with the radial direction of the shaft is effective, wherein a correspondingly small looping arc of the transmission means is realized, thereby generating the highest pressing forces.

One disadvantage of such proposed presser devices resides in the fact that considerable problems are encountered which can only be overcome by incurring great additional constructional expense. For example, in some cases, a plurality of complicated and, therefore, difficulty produced and expensive parts are necessary, thereby increasing the manufacturing costs and also purchase price of the transmission. Furthermore, the provision of the plurality of parts increases the space requirements necessary for using the transmission.

In the afore-mentioned proposed transmission arrangements, the presser device includes an axially displaceable friction disc and a support ring fashioned as a collar fixedly secured to the shaft with opposed screw faces being provided in the disc and collar between which faces are interposed rolling bodies. By virtue of this construction, the axial interval between the mutually opposite screw faces of the collar and of the friction disc changes by the amount by which the axially displaceable friction disc is displaceable or must be displaceable within the transmission ratio range of the transmission. Thus, according to the ratio setting of the transmission, different portions of the screw faces come to bear by way of the rolling bodies, which is the prerequisite for the generation of ratio dependent pressing forces, for the portion of the screw face allocated to each ratio setting can be formed with respect to its gradient so that an optimum pressing force for the desired transmission ratio setting is produced.

However, if a change of the direction of torque takes place; i.e., an exchange of the drive input and drive output sides of the transmission, then the proposed presser devices shift over until the rolling bodies come into abutment on a branch of a surface of the screw faces which is opposite in the peripheral direction. Consequently, especially in transmitting large loads or great powers at transmission ratio setting where shaft collar and adjacent cone pulley are in the region of their maximum interval, such impact forces are generated that the frequently occurring change of the torque direction results in a destroying or deforming of the screw faces and the rolling bodies so that the presser device can no longer fulfill its task in the predetermined manner, and, effectively, becomes useless. The same difficulties arise if a presser device is arranged only on one of the transmission shafts, if the torque direction is reversed with drive input and drive output shafts remaining the same.

One attempt to avoid the afore-mentioned drawback in the proposed transmission arrangement is described in U.S. Pat. No. 3,224,287 wherein, over the shift-over distance, the screw faces either of the support ring, the shaft collar, or the opposite cone pulley are caused to follow up in the axial direction so that the axial play between screw faces and rolling bodies is reduced or compensated. However, this solution requires complicated mechanical, hydraulic or mechanical-hydraulic follow-up devices, thereby making the resulting transmission arrangement extremely expensive and extraordinarily large in weight and construction volume.

In commonly assigned U.S. application Ser. No. 460,090, a cone pulley transmission is provided wherein the shift-over play is so slight over the entire ratio range of the transmission, with the aid of simple means, that serious damage to the presser device cannot occur even during frequent change of the torque direction. For this purpose, in principle, it is ensured that the shift distance sum on the drive input and drive output sides of the transmission is different.

This is occasioned by the fact that, first, the support ring, forming a portion of the presser device, is caused to follow-up over the ratio setting distance of the axially displaceable cone pulley and second, one of the cone pulleys has an inclination differing from the other cone pulleys in accordance with the particular desired application of the transmission arrangement.

While this last-mentioned solution may be satisfactory for many applications of the transmission, a problem nevertheless arises due to the shifting of the presser device over the ratio setting distance.

The present invention is concerned with the task to provide a structurally simple transmission arrangement which operates reliably with a presser device being provided which is completely free from shift-over over the entire ratio setting distance.

The underlying problems are solved in accordance with the present invention by providing a cone pulley transmission arrangement which includes a presser device for the generation of torque dependent and ratio dependent pressing forces between the cone pulleys and the transmission means which includes in distribution over the periphery of the device several pairs of obliqued faces of variable gradient lying opposite one another in the peripheral direction with rolling bodies, cooperating with the pairs of oblique faces, being supported axially at least indirectly against an adjacent cone pulley and an axially mounted support ring with the cone pulley loaded by the presser device being supported exclusively through the presser device and in shape-locking engagement with rolling bodies in the peripheral direction.

The term "exclusively" should be understood to mean that such support does not exclude the arrangement of a support spring bridging over the presser device or the use of a similar support device which is provided especially in order to support the axially displaceable cone pulley forming a portion of the presser device when the transmission is halted so that it does not shift under the initial stress of the transmission means. By virtue of such a support arrangement, the initial stress of the transmission means and the relevant axial position of the axially displaceable cone pulley is maintained even when the transmission is stationary.

According to one feature of the present invention, the pairs of oblique faces are formed as channels extending substantially parallel with the shaft axis with the effective oblique face gradient being varied over the channel length and with the rolling bodies, fashioned as balls, being substantially axially displaceable with the transmission ratio. The balls are in abutment on a wedge face of a support ring having the respective channel and/or in abutment with a surface of the adjacent cone pulley.

By virtue of the afore-noted feature of the present invention, a peripheral and a direct axial component are not generated as in known transmissions; rather, in the present invention, a peripheral and an initially radially directed component of a transmission force is generated in the presser device. The radial force component is deflected by the wedge face of the support ring and/or the surface of the adjacent cone pulley into the axial direction. Thus, the transmission ratio of the deflection can be 1:1 or equally lie thereabove or therebeneath dependent upon how the flanks or curve branches of the channels are formed in the individual case.

The above-noted measures according to the present invention have the effect that the balls are moved axially in the channel accompanying the axial displacement, thereby producing the ratio setting of the transmission. Thus, the balls, in each case, come into abutment with such oblique face inclinations of the channel as are designed for the production of the correct torque dependent and ratio dependent pressing force in each case. Since the balls in this movement always remain lying in the channel, shift-over distances of the nature and magnitude which occurred in known transmissions can no longer occur so that, in accordance with the present invention, it is possible to achieve for the first time a presser device which is free from shift-over and yet satisfies all normal requirements of the transmission.

Moreover, viewing the present invention from expenses involved in manufacturing, the means for carrying out the invention are neither more complicated nor more extensive than the simplest known presser device since the invention makes a minimum of measures suffice, namely, oblique faces or curve branches, a support ring and the shape-locking engagement in the peripheral direction of the balls with the cone pulley loaded by the presser device.

In accordance with another feature of the present invention, the balls may be permitted in the ratio shift of the transmission, to carry out not only an axial but also a radial movement, by an appropriate oblique placing and/or doming of the channels. By virtue of this feature, the length of the channels could be shorter than the axial shift distance of the displaceable cone pulleys, thereby reducing the space requirements for the transmission. Also, the frequently necessary doming of the cone pulleys could readily be replaced in this manner.

According to the present invention, the simplest and most expedient arrangement of the channels is such that the balls, on a variation of the transmission ratio, carry out exclusively a movement parallel with the shaft axis with the length of the channels corresponding at least to the axial setting range of the displaceable cone pulleys.

The channels according to the present invention may have a V-shaped cross-section starting from the curve branches of the oblique faces delivering the torque dependent and ratio dependent pressing forces; however, the possibility also exists that the channels, starting from the curve branches of the oblique faces delivering the torque dependent and ratio dependent pressing forces, may have a cross-section corresponding to the contour of the rolling bodies.

By virtue of the construction of the presser device according to the present invention, the rolling bodies, for example, balls, place themselves under the occurring force against one of the flanks or oblique faces of the channels and are thereby lifted by a very slight amount out of the bottom of the channels. This lifting is caused by the unavoidable elasticity of the materials utilized in fashioning the elements of the presser device. If starting or overload surges occur, as a result of the elasticity of the materials, the balls travel somewhat more upwards on the oblique faces into a region where, in the case of normal working of the presser device, they are not in abutment. To avoid this difficulty, according to yet another feature of the present invention, the channels, starting from the curve branches delivering the torque dependent and ratio dependent pressing forces, are provided with further curve branches of constant gradient upwardly and outwardly adjoining these with the further curve branches being defined according to a logarithmic mathematical inter-relationship. Moreover, with starting or overload surges, the problem of the shift-over play does not arise since such torque surges to not occur in connection with a change of the direction of rotation or direction of torque.

If a transmission arrangement is provided in which a support ring is supported axially, possibly through a bearing, against the ratio setting member in the form of a control lever pivotably mounted centrally between the transmission shafts and is pivotable by a threaded spindle or the like arranged on the far side of one of the shafts in relation to the bearing, and with the adjacent cone pulley being axially displaceable and supported directly through the presser device, then according to another feature of the present invention, the channels may be arranged on the periphery of a sleeve placed fast in rotation and non-displaceably on the transmission shaft. The sleeve may be detachably secured on the transmission shaft, thereby simplifying manufacturing and also providing the possibility of replacing the part containing the channels in case of damage, wear, etc., in a simple manner.

It is also possible in accordance with the present invention to arrange the channels in a bore of a hollow cylinder with the hollow cylinder being connected by one of its axial ends with a radially inwardly directed circumferential flange which, in turn, is connected with a sleeve placed fast in rotation and non-displaceably on the shaft. The flange may be provided with windows distributed over the periphery and allocated to the channels with the adjacent cone pulley or the support ring having extensions axially passing through the windows for engagement with the rolling bodies.

Thus, in principle, the possibility exists in accordance with the present invention of providing both radially outwardly and radially inwardly opening channels for the presser device in dependence upon the type of construction which is most favorable with respect to the use of the transmission.

The shape-locking arrangement of the balls with the presser device in the peripheral direction of the adjacent cone pulley may be effected, as noted hereinabove, by V-shaped channels; however, rectangularly U-shaped or round U-shaped pockets may be provided in the cone pulley or axial extensions thereof to also effect such engagement. The pockets open axially in the direction toward the balls and extend in the radial direction or obliquely for the simultaneous formation of a wedge surface.

Likewise, according to the present invention, the abutment face in the support ring or extensions thereof for the balls can also be fashioned as V-shaped, rectangularly U-shaped or rounded U-shaped pockets which open axially in the direction towards the balls.

If a transmission arrangement is provided wherein two diametrically mutually opposite cone pulleys are supported through arms extending radially of a setting spindle arranged centrally between the shafts, and antifriction bearings which are equidistantly displaceable by the setting spindle with one of the two other cone pulleys being supported through the presser device while the other is axially non-displaceably supported on its shaft, then in accordance with another feature of the present invention, the support ring may be supported axially non-displaceably against a gearbox or the like through an axial bearing with the channels being arranged on the periphery of a sleeve connected fast in rotation with the transmission shaft but axially displaceable thereon and with the sleeve, protruding with an axial extension or prolongation through the support ring, having on a free end thereof a third arm acting through a rotary connection with the third arm arranged radially of the setting spindle and displaceable by it equidistantly from the other two arms.

By virtue of the last-mentioned feature of the present invention, an arrangement is made that on variation of the transmission ratio, the balls are not driven together with support ring and cone pulley by means of the channels, but rather the channels with the presser device otherwise standing axially still are drawn through beneath the balls according to the variation of the ratio setting of the transmission.

Preferably, according to the present invention, rotary connection between sleeve and the third arm may be formed by means of a radial collar provided on the extension of the sleeve with a slip ring being connected with the third arm and surrounding the radial collar in shape-locking manner.

If a transmission arrangement is provided wherein the axially displaceable cone pulley is supported on the respective transmission shaft through a hydraulic cylinder piston unit, which includes a cylinder jacket firmly connected with the cone pulley and if a pressure medium drawn from a pressure medium source is allocated through a control slide valve articulated for the adjustment and maintenance of the ratio setting of the transmission to a transmission setting member in the form of a setting lever articulated to one of the axially displaceable cone pulleys and voluntarily operable for the transmission ratio adjustment, then in accordance with yet another feature of the present invention, the channels are arranged on the periphery of an axially extending hollow cylindrical flange which crosses the cylinder space of the axially displaceable cone pulley with a hub, seated in a liquid tight manner firmly on the shaft at a spacing therefrom being arranged before a free end of the flange. Against a face edge of the hub, directed towards the cone pulley, the balls are axially supported with the piston being displaceably guided on the hollow cylindrical flange with a hollow cylindrical sleeve extending axially on the side remote from the cylinder space. The piston, within the hollow cylindrical sleeve, in the region of the attachment of the sleeve to the piston, forms the support ring with wedge face directed towards the hub and the channels. An outlet is provided in the hub for the pressure medium within the sleeve with the free end of the sleeve with the hub forming a control edge connected with the outlet in such manner that the pressure medium outlet is increasingly constricted on increasing of torque.

By virtue of the last-mentioned transmission arrangement, the part containing the channels for the balls is fashioned as a component of the cone pulley and displaced axially therewith. Moreover, the construction point functions in that, as noted above, the balls are lifted slightly out of the channel in torque transmission, thereby leading to an axial adjustment of the piston of the cylinder piston unit which is minimal, but adequate in view of the steepness of the characteristic of the constriction until equilibrium prevails between the axial force exerted by the presser device and pressure medium pressure in the cylinder chamber of the cylinder piston unit, which then also at the same time corresponds to the correct pressure force on the drive output side. On the other hand, the balls of the presser device on the drive input side are pressed completely into the bottoms of the channels; therefore, the presser device is bridged over on the drive input side and the hydraulic supporting of the cone pulley takes place there with the requisite force.

To reduce the force flux passing through the presser device in a transmission arrangement and to relieve the presser device between piston and cylinder jacket, in accordance with the present invention, a second annular piston may be provided and supported axially against the hub with an annular space formed between the sleeve and annular piston including a venting bore for the pressure medium flowing away over the control edge. By virtue of this construction, the supporting of the cone pulley takes place partly through the axially fixed annular piston so that only the remainder of the requisite supporting force has to be supplied by way of the presser device.

In accordance with yet another feature of the present invention, a cone pulley transmission may be provided wherein the channels are arranged on the periphery of a sleeve possibly detachably placed fast in rotation and non-displaceably on the transmission shaft with the support ring being arranged on the forward side of the cylinder of a cylinder piston unit guided axially on the shaft with axially displaceable cylinder and piston fast with the shaft. The cylinder chamber of the cylinder piston unit is arranged between support ring and piston with the pressure medium being drawn from the pressure medium source and supplied to the chamber. The cylinder is displaceably guided on the shaft at its rearward end remote from the support ring with an axially extending flange, upon which is guided a thrust ring cooperating with the cylinder and displaceable mechanically axially for the adjustment of the transmission ratio. Between the flange and the thrust ring, a control edge is formed by way of which the pressure medium supplied to the cylinder space flows away.

In the last-mentioned construction according to the present invention, the support ring is hydraulically held and displaced by a cylinder piston unit with the displacement of the cylinder of the cylinder piston unit taking place mechanically-hydraulically by means of the thrust ring and the control edge formed thereon.

Preferably, the cylinder may by guided for axial displacement liquid-tightly in the cylinder jacket of the cone pulley formed as cylinder radially outside the support ring with an extension directed towards the adjacent cone pulley having a diameter smaller than that of the cylinder whereby the presser device is relieved because a part of the pressing force necessary for the transmission side passes directly hydraulically to the cone pulley adjacent to the presser device.

Additionally, in the last-mentioned transmission arrangement, the thrust ring may be supported through an axial bearing against a setting ring with the setting ring meshing through a toothing or gearing on the periphery thereof with a pinion of a shaft arranged rotatably centrally between the transmission shafts for the adjustment of the transmission ratio. Also, the setting ring may be in engagement with a threading placed radially within the toothing with a part fast in relation to a gearbox.

Accordingly, it is an object of the present invention to provide a cone pulley transmission arrangement which avoids, by simple means, the afore-mentioned shortcomings and drawbacks encountered in the prior art.

Another object of the present invention resides in providing a cone pulley transmission arrangement which includes a presser device which is completely free from shift-over over the entire transmission ratio setting distance.

A further object of the present invention resides in providing a cone pulley transmission arrangement which functions accurately, yet minimizes the number of parts therefor.

A still further object of the present invention resides in providing a cone pulley transmission arrangement which ensures a precise transmission of forces throughout the entire transmission ratio range.

Yet another object of the present invention resides in providing a cone pulley transmission arrangement which permits frequent changes of direction of rotation and direction of torque application with minimum detrimental effects on the components thereof.

These and other objects, features, and advantages of the present invention will become more apparent from the following description when taken in conjunction with the accompanying drawings which show, for the purposes of illustration only, several embodiments in accordance with the present invention, and wherein:

FIG. 15 is a partial cross-sectional view of a cone pulley transmission arrangement with a mechanical-hydraulic adjustment of the presser device in accordance with the present invention.

Figure 1:
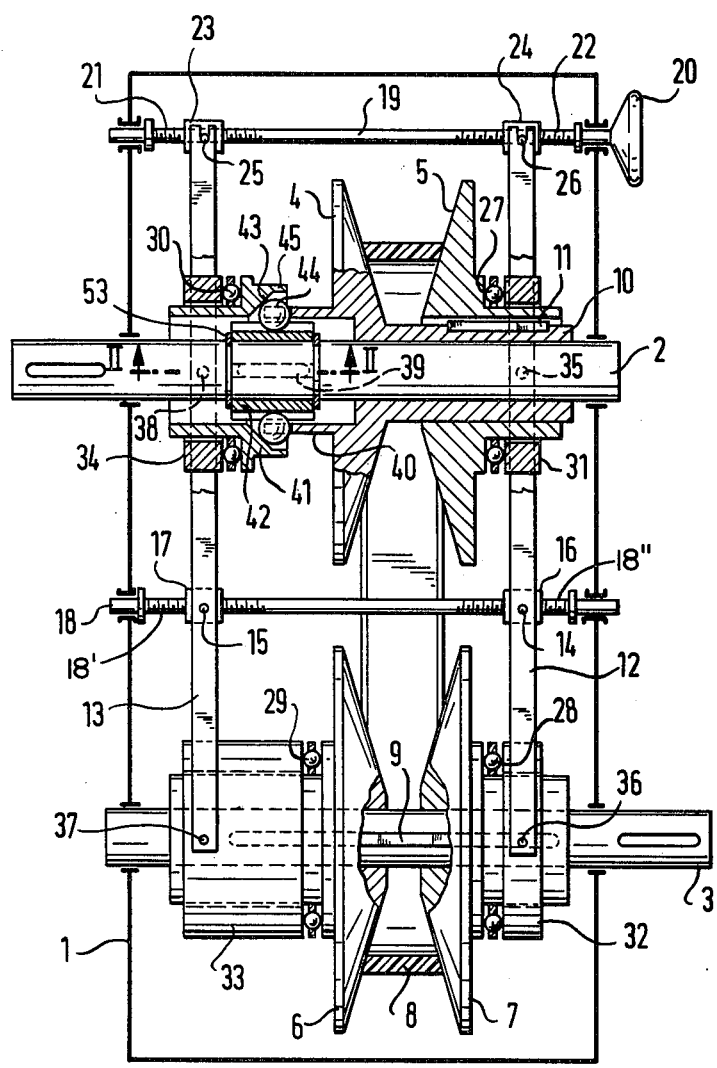
FIG. 1 is a partial cross-sectional view of a first embodiment of a cone pulley transmission in accordance with the present invention.

Referring now to the drawings wherein like reference numerals are used throughout the various views to designate like parts and, more particularly, to FIG. 1, according to the figure, an infinitely variable cone pulley transmission includes a gearbox 1 having rotatably arranged therein by conventional anti-friction bearings (not shown) a drive input shaft 2 and a drive output shaft 3. Cone pulleys 4, 5, 6, 7 are arranged in pairs on the respective shafts 2, 3 with a traction means 8 being disposed between the pairs of pulleys so as to transmit power between the shafts 2, 3.

A key 9 mounts the cone pulleys 6, 7 on the drive output shaft 3 so as to be mutually axially displaceable with respect to one another and non-rotatable with respect to the shaft 3.

The cone pulley 4 is mounted on the shaft 2 for axial displacement and includes a sleeve 10 which grasps the shaft 2 with the cone pulley 5 being mounted on the sleeve 10 by a key 11 so as to be non-rotatable with respect to the sleeve 10, but axially displaceable with respect to the cone pulley 4.

Control levers 12, 13 operatively adjust the axial position of the cone pulleys 4, 5, 6, 7 so as to set the desired transmission ratio between the two transmission shafts 2, 3. The control levers 12, 13 are pivotable about journals 14, 15 arranged at the gearbox 1 centrally between the shafts 2, 3. The journals 14, 15 are provided on threaded blocks 16, 17 arranged on a threaded spindle 18 rotatably mounted in the gearbox 1. The spindle 18 is provided with opposite threaded portions 18', 18" to permit displacement of the blocks 16, 17. Upon a turning of the spindle 18 by suitable conventional means (not shown), the blocks 16, 17 are displaced so as to compensate for tolerances and inaccuracies which may occur due to wear, thereby permitting a readjustment of the pivot bearings or journals 14, 15 of the control levers 12, 13.

A setting spindle 19 is rotatably mounted in the gearbox 1 and extends parallel to the shaft 2. The control levers 12, 13 are pivotably mounted about journals 25, 26 provided on threaded blocks 23, 24 arranged on the spindle 19. The setting spindle 19 is provided with contrary threaded portions 21, 22 so as to permit displacement of the blocks 23, 24. Upon a turning of the handwheel 20, the spindle 19 is rotated so as to displace the blocks 23, 24, thereby pivoting the control levers 12, 13 and varying the transmission ratio.

Pivot bearings 27, 28, 29, 30, bushes 31, 32, 33, rolling bodies, for example, balls 44, a support ring 41, and bush 34 are provided for supporting the cone pulleys 4, 5, 6, 7 against the control levers 12, 13. Journals 35, 36, 37, 38 pivotally connect the control levers 12, 13 to the bushes associated with the respective cone pulleys 4–7.

A presser device provides a rotary connection between the cone pulleys 4, 5 and the shaft 2, which presser device generates torque dependent and ratio dependent transmission forces between the cone pulleys 4, 5 and the traction means 8.

Figure 2:
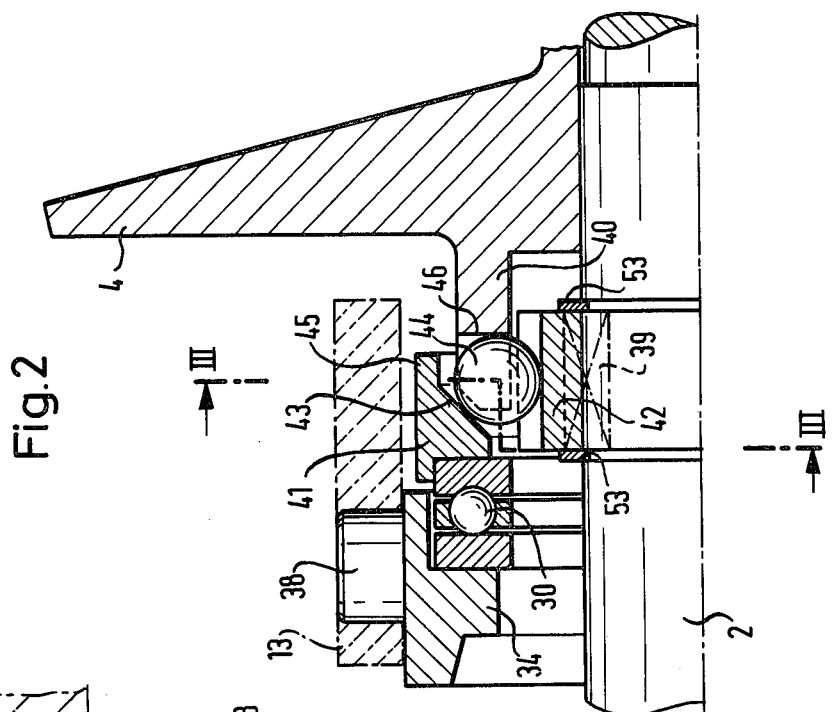
FIG. 2 is a partial cross-sectional view, on an enlarged scale, of a presser device of the embodiment of FIG. 1 taken along line II—II.
Figure 3:
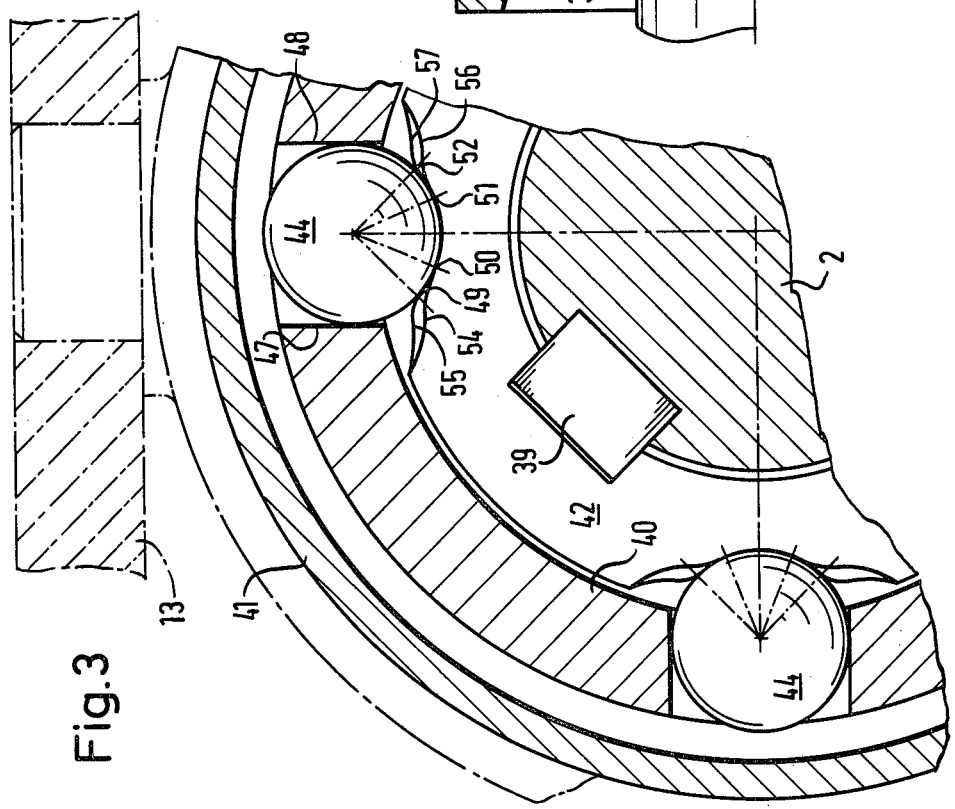
FIG. 3 is a partial cross-sectional view, on an enlarged scale, taken along line III—III of FIG. 2.

As shown in FIGS. 1, 2 and 3, for the formation of a presser device, the cone pulley 4 is provided with a widened hub 40 having a diameter greater than the diameter of the shaft 2. A support ring 41 is arranged axially opposite the hub 40 with a sleeve 42 being non-displaceably and non-rotatably secured to the shaft 2 in the area of the hub 40 and end face of the support ring 41 by circlips 53 and key 39.

As shown clearly in FIGS. 2 and 3, incisions or notches are provided in the hub 40 into which the balls 44, serving for torque transmission, are inserted. The notches are defined by surfaces 46, 47, 48.

The support ring 41 is provided with a conical annular abutment surface 43 for supporting the balls 44 and for force deflection. An extension 45 is provided on the support ring 41 for securing or preventing the balls 44 from overruning the rotary connection.

The sleeve 42 is provided with substantially axially extending channels having oblique faces or curve branches 49, 50 and 51, 52 which accommodate the balls 44. While the cone pulleys 5, 6, 7 are supported firmly in the axial direction against their control levers 12 and 13, the supporting of the cone pulley 4 takes place directly through the presser device against the control lever 13. When a torque is introduced into the shaft 2 between the curve branches 49, 50 or 51, 52, the support faces 46 and 47 or 48 and the conical annular abutment surface 43, forces are generated which have a component in the peripheral direction and a component in the axial direction of the shaft 2. The force component in the axial direction supports the cone pulley 4 in the axial direction while the force component in the peripheral direction ensures the entraining of the cone pulley 4 and with it the cone pulley 5.

The individual channels of the sleeve 42 are formed so that with freedom of movement over the entire ratio setting distance a torque dependent and ratio dependent pressing of the cone pulley 4 is readily achieved. For this purpose, each of the substantially axially extending channels is configured so that their respective bottom portions have a radius equal to the radius of the balls 44 with such bottom portions extending parallel to their respective axis of the shaft 2. The gradient branches 49, 50 and 51, 52 of the oblique faces are tangential on both sides over the length of the sleeve 42 to these thus axially extending cylindrical channels. The points of transition to the oblique faces between bottom radius and the respective tangent thereto are dependent upon the ratio dependent radient angle of the curve branches, which is formed between the bottom radius of the point of contact of the rolling bodies or balls 44 and the connection line between rolling bodies or balls 44 and shaft center. Here the gradient angles of the oblique faces are made so that, for each ratio dependent position of pressor device, the optimum pressing required by the pressing law is achieved for the cone pulleys 4 and 5 on the drive input side, which then leads to the generation of the correct pressing force on the cone pulleys 6 and 7 on the drive output side also.

It is also possible to configure the channels so that they are fashioned as prisms which terminate in a point facing the direction of the shaft axis with mutually obliquely placed side faces of the prisms being of such an inclination so as to deliver the optimum torque dependent and ratio dependent pressing force in accordance with the desired ratio positions of the transmission. These oblique faces occur due to the fact that, from their calculated point of contact with the balls 44, a ball tangent is drawn to the line of connection of the ball centers with the shaft axis.

Since the materials used for the construction of the presser device are elastically deformable within certain limits under a force action, in starting and over-load surges, it is unavoidable that the balls 44 somewhat run up on the oblique faces. In order to avoid the operation of the transmission with incorrect pressing forces, as shown most clearly in FIG. 3, curve branches 54, 55, 56, 57 having a constant gradient according to a logarithmic mathematical inter-relationship are provided over the whole length of the sleeve 42 to the exterior following the curve branches 49, 50 and 51, 52 serving for the torque dependent and ratio dependent pressing force generation. In normal operation of the transmission; i.e., not starting or no over-load surges, these curve branches 54–57 do not come into effect.

Figure 4:
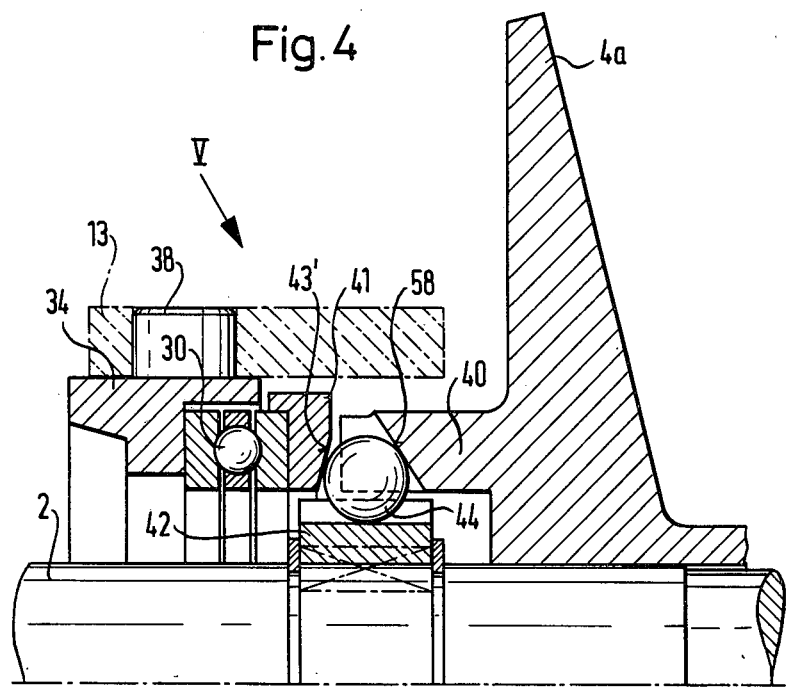
FIG. 4 is a partial cross-sectional view of a further embodiment of a presser device in accordance with the present invention.

As shown in FIG. 4, the support ring 41 of the presser device has a conical abutment surface 43' which is arranged at a different inclination as compared to the conical annular abutment surface 43 of the presser device of FIGS. 1–3, and a support or abutment face 58 on the flange of the hub 40 of the cone pulley 4a is also conically inclined towards the channels of the sleeve 42. The effect of the inclinations of the two support faces 43', 58 being added here in relation to generation of the pressing force.

Figure 5:
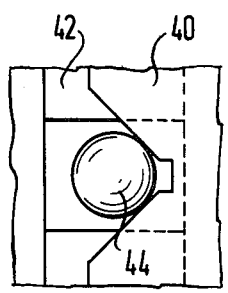
FIGS. 5, 6 and 7 are detailed views of further embodiments of presser devices in accordance with the present invention taken in the direction of the arrow V in FIG. 4.
Figure 6:
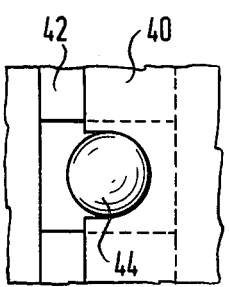
Figure 7:
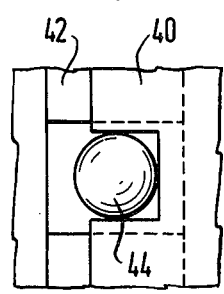

As shown in FIGS. 5, 6 and 7, notches or incisions provided in the hub 40 of the cone pulley 4a for the peripheral entrainment of the balls 44 may be fashioned so as to have a V-shaped, round U-shaped or rectangular U-shaped cross-sectional configuration.

Figure 8:
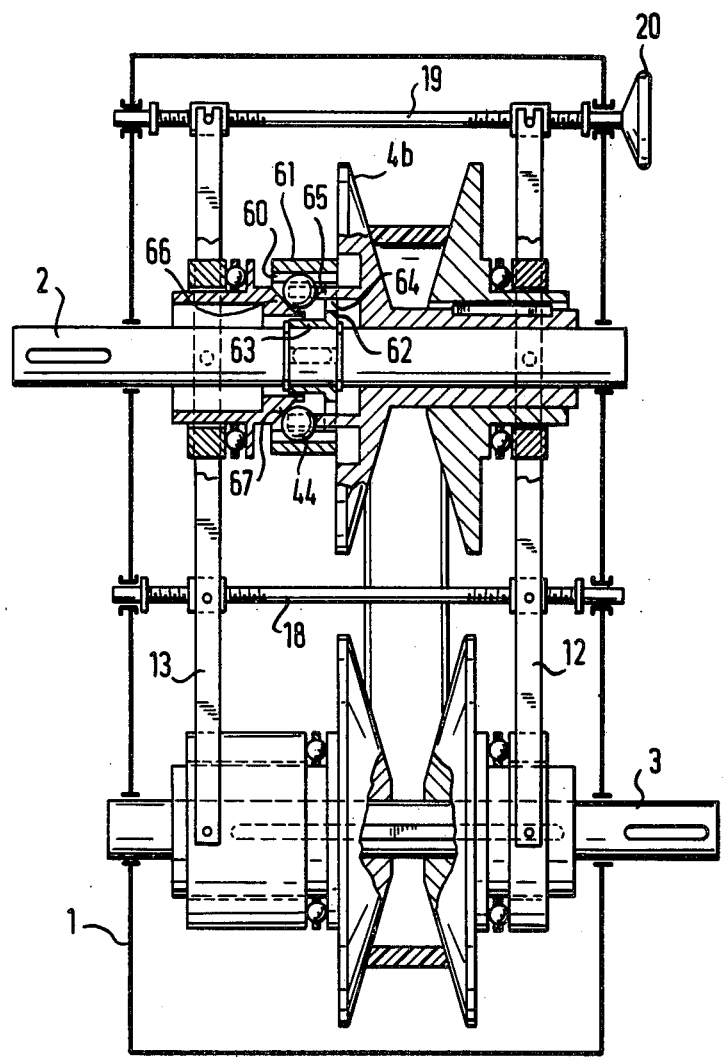
FIGS. 8, 9, 10, 11 and 12 are partial cross-sectional views of further embodiments of cone pulley transmissions in accordance with the present invention.

In FIG. 8, a cone pulley transmission is provided which essentially corresponds to that of FIGS. 1-3; however, the channels 60 are arranged in the bore of a hollow cylinder 61 which is connected by one of its axial ends with a radially inwardly directed peripheral flange 62. The flange 62 is connected with a sleeve 63 fitted fast in rotation and non-displaceably on the shaft 2. The flange 62 has distributed over the periphery thereof windows 64 allocated to the channels 60 for accommodating extensions or prolongations 65 provided at the cone pulley 4b for engagement with the balls 44. The support ring 66 is provided with an outwardly pointing edge face 67 which forms an abutment surface for the balls 44.

Upon the introduction of a torque to the shaft 2, a force directed in the peripheral direction and a radially inwardly directed force are exerted by the balls 44 with the radially inwardly directed force being deflected in the axial direction by means of the wedge face 67 of the support ring 66.

Figure 9:
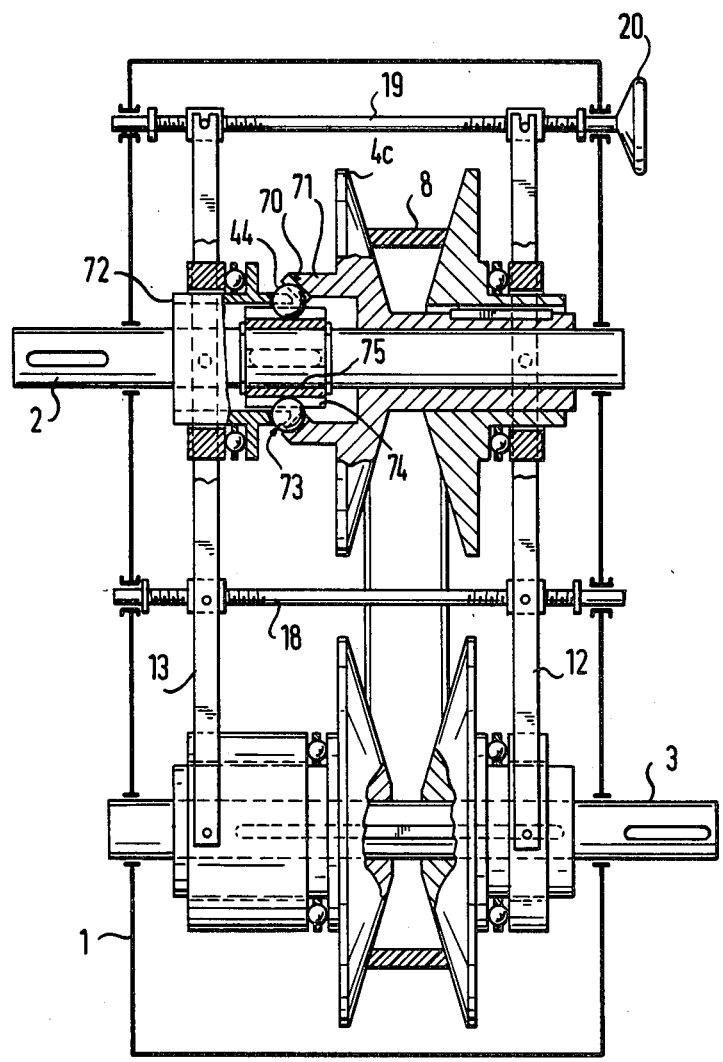

In FIG. 9, a transmission arrangement essentially similar to the arrangement of FIG. 4 is provided wherein wedge faces 70 forming an abutment surface for balls 44 are seated on the hub 71 of the cone pulley 4c so that on the support ring 72, the balls 44 are held axially in pockets 73.

Figure 10:
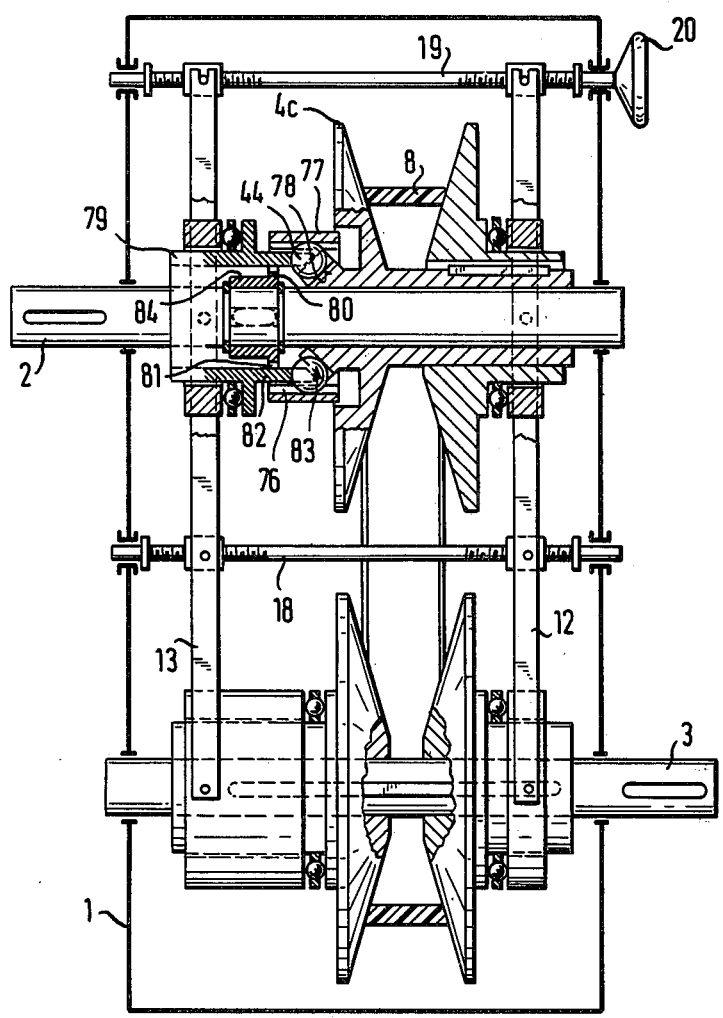

While according to FIG. 9, the channels 74 of the sleeve 75 are radially outwardly open, as shown in FIG. 10, channels 76 may be provided which are radially inwardly open in the bore of a hollow cylinder 77. The wedge or abutment faces 78 are arranged on a cone pulley 4c, while the support ring 79 engages with extensions 82 through flange 80 by means of windows 81 with the extensions 82 being provided with pockets 83 for receiving the balls 44. As with the arrangement of FIG. 8, in FIG. 10, the hollow cylinder 77 is connected through flange 80 with a sleeve 84 which is seated fast in rotation and axially non-displaceable on the shaft 2.

Figure 11:
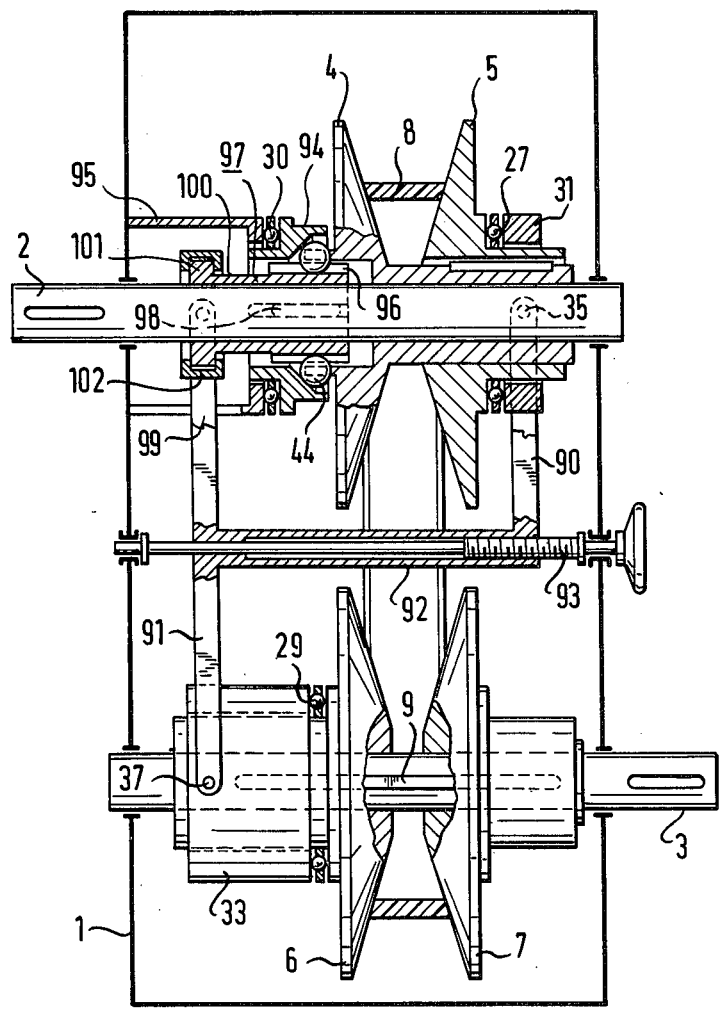

In FIG. 11, a cone pulley transmission is provided in which two diametrically mutually opposite cone pulleys 4, 7 are supported on their respective shafts 2, 3 axially stationarily with the other two diametrically mutually opposite cone pulleys 5, 6 being equidistantly displaceable by arms 90, 91 which extend radially from a tube 92 mounted on and displaceable by a setting spindle 93 arranged centrally between the transmission shafts 2 and 3.

In the arrangement of FIG. 11, the presser device is arranged on the axially stationarily supported cone pulley 4, while correspondingly the support ring 94 is supported through a pivot bearing 30 against a housing part 95.

For the adjustment of the presser device in accordance with the ratio setting of the transmission, a sleeve 97 having the channels 96 is axially displaceable on the shaft 2, but held fast in rotation with respect to the shaft 2 by a key 98. The axial displacement of the sleeve 97 is effected through a third arm 99 arranged on the tube 92 equidistantly from the arms 90 and 91. The arm 99 acts on a prolongation or extension 100 of the sleeve 97 which protrudes axially through the support ring 94 by way of a rotary connection formed from a radial collar 101 of the extension 100 and a slip ring 102 grasping in shape-locking manner around collar 101 and connected with the arm 99.

By virtue of this last-mentioned construction, an arrangement is provided wherein the support ring 94, balls 44 and cone pulley 4 are axially stationary, while according to the ratio setting of the transmission, the sleeve 97 with the channels 96 are shifted axially by means of the arm 99 and the setting spindle 93.

Figure 12:
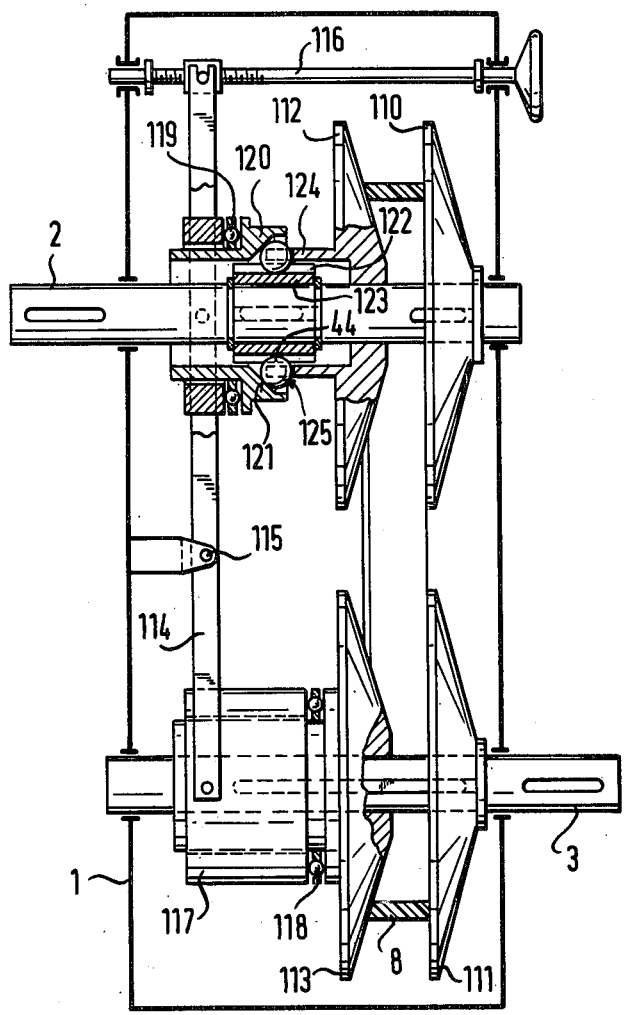

In FIG. 12, a cone pulley transmission is provided wherein each two radially mutually opposite cone pulleys 110 and 111 are arranged axially stationarily on the shafts 2, 3, while the other two radially mutually opposite cone pulleys 112 and 113 are axially displaceable by means of a setting lever 114 for the transmission ratio setting. The setting lever 113 is rotatably mounted at 115 centrally between the shafts 2, 3 and is pivotable by a setting spindle 116 arranged on a far side of the shaft 2 in the gearbox 1.

While the cone pulley 113 is supported through a bush 117 and a pivot bearing 118 directly against the setting lever 114, a presser device is situated between setting lever 114 and cone pulley 112 with the presser device including a support ring 120, axially supported through a pivot bearing 119 against the setting lever 114, a wedge or abutment face 121, balls 44, a sleeve 123 having channels 122 and recesses 125 situated in a flange 124 of the cone pulley 112 for the shape-locking engagement in the peripheral direction of the balls 44 with the cone pulley 112.

All of the above-described cone pulley transmissions provide a presser device arranged only on one of the transmission shafts and it is possible for the transmission side selected for this fundamentally to be the input or output side of the transmission. As readily apparent, with appropriate design of the oblique faces of the channels of the presser device, in accordance with known mathematical inter-relationship of cone pulley transmissions, the correct pressing force results on the other transmission side as support force against the control levers. However, the above-described transmission arrangements are suitable only in situations wherein there is a constant torque direction; i.e., no exchange takes place between drive input and drive output sides. If an exchange is to be expected, then the presser devices described hereinabove are arranged in a corresponding manner on both transmission shafts.

Figure 13:
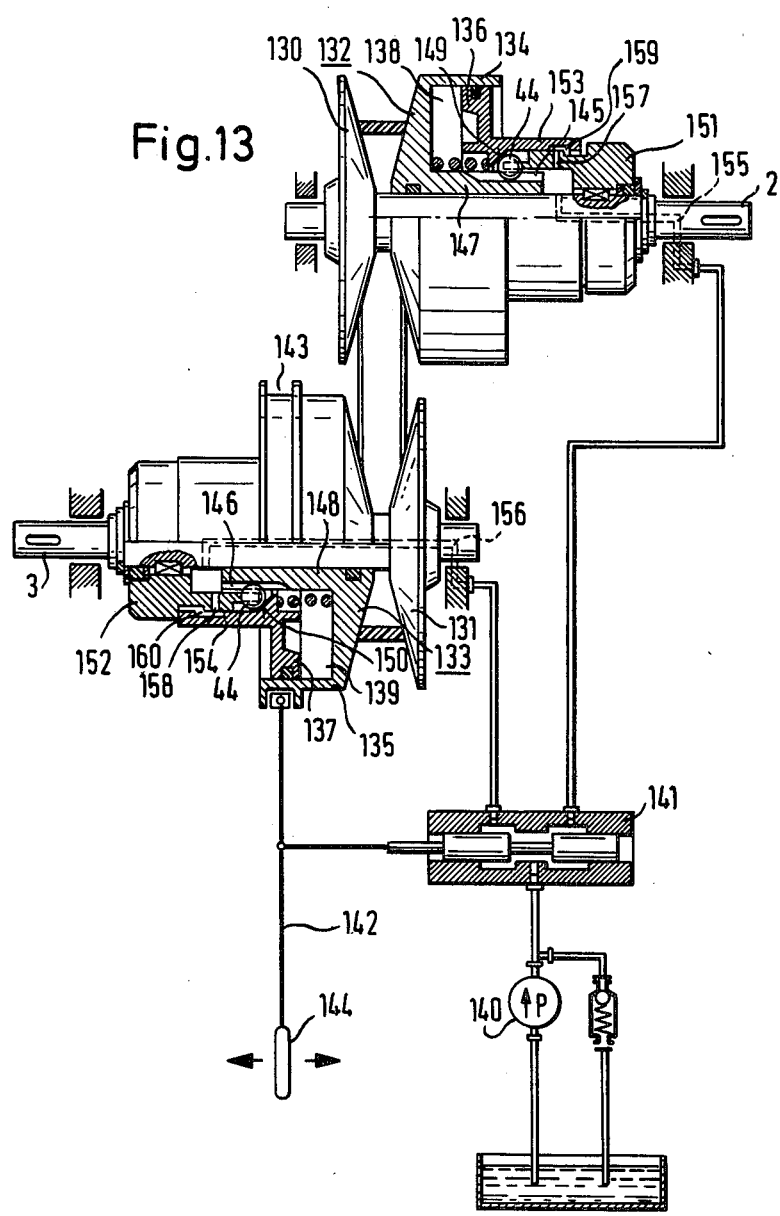
FIGS. 13 and 14 are partial cross-sectional views of cone pulley transmissions with hydraulic supporting of the axially displaceable cone pulleys in accordance with the present invention.
Figure 14:
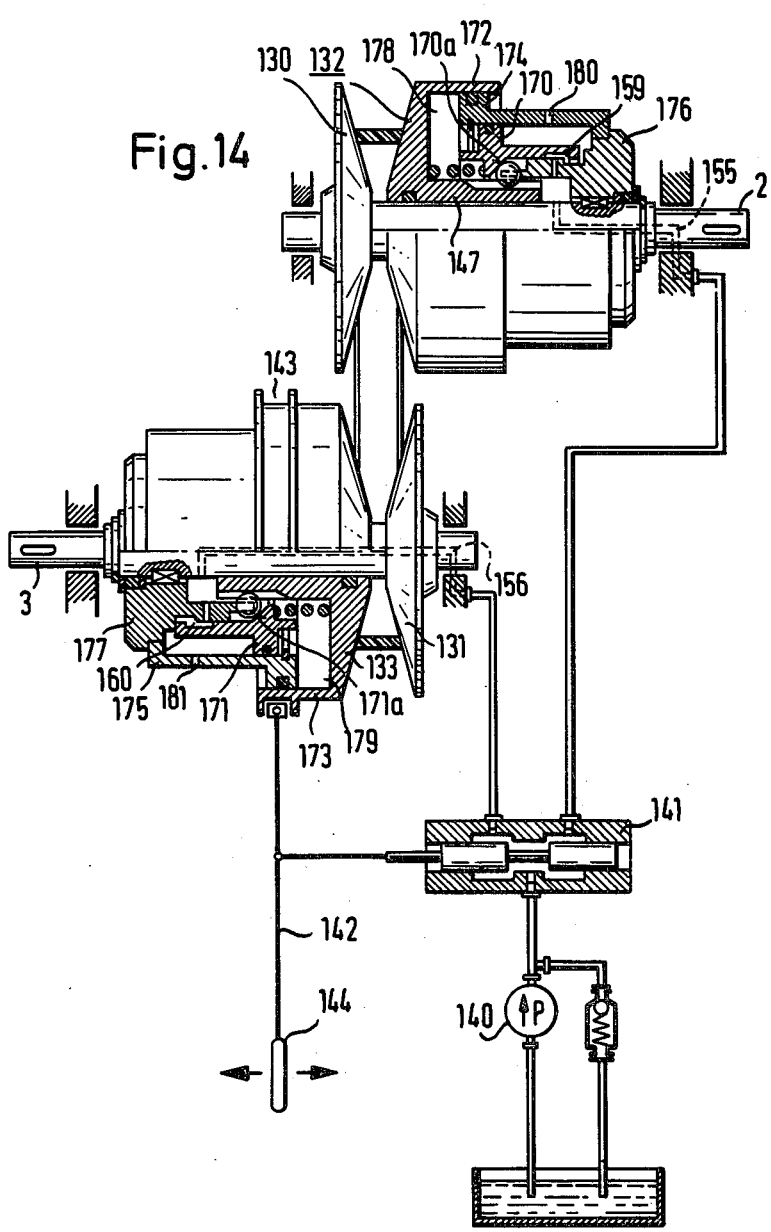

FIGS. 13, 14 and 15 provide an example of transmission arrangements wherein presser devices are arranged on both sides with the transmissions being of a hydraulic and a hydraulic-mechanical nature for supporting of the respective cone pulleys.

As shown in FIG. 13, on the drive output shaft 2 and the drive input shaft 3, two diametrically mutually opposite cone pulleys 130 and 131 are arranged fast with the respective shafts, while the other two diametrically mutually opposite cone pulleys 132 and 133 are displaceable axially on the shafts for effecing a desired transmission ratio adjustment. The cone pulleys 132 and 133 form a cylinder piston unit with cylinder jacket 134, 135, piston 136, 137 and a cylinder chamber 138, 139 to which a pressure medium drawn from a pressure medium source 140 is allocated in a conventional manner through a control slide valve 141. The setting member of the control slide valve 141 is pivoted to a lever 142 which engages in a peripheral groove 143 on the cone pulley 133 for the maintenance of the transmission ratio and is adjustable at 144 for the adjustment of the transmission ratio.

Channels 145, 146 of the presser devices are situated on the periphery of an axially extending hollow cylindrical flange 147, 148 of the cone pulleys 132, 133 crossing the cylinder chamber 138, 139 with the support rings and their wedge faces 149, 150 being fashioned as components of the pistons 136, 137. The balls 44 are supported against the wedge or abutment faces 149, 150 and are supported axially against a flange 151, 152, which flange is arranged axially and fast in rotation on the shafts 2 and 3, respectively. The pistons 136 and 137 are axially displaceably guided on the flanges 151 and 152, respectively, with a hollow cylindrical sleeve 153, 154 extending axially on the side remote from the cylinder chamber 138, 139.

The pressure medium from the control slide valve 141 arrives at the cylinder chambers 138, 139 through bores 155, 156 provided in the shafts 2 and 3. The return flow of the pressure medium is effected through bores 157 and 158 of the flanges 151, 152, each of which defines a control edge 159 and 160, respectively, formed between the sleeves 153 and 154 and the flanges 151 and 152, respectively.

The manner of operation of the transmission arrangement of FIG. 13 is as follows.

According to the transmission ratio set on the lever 142, the control slide valve 141 allocates the pressure medium necessary for the setting of the transmission ratio to the cylinder chambers 138 and 139, a deviation from the intended transmission ratio being sensed by means of the annular groove 143 and leading by way of the control slide valve 141 to a corresponding correction.

If, in the illustrated arrangement, the transmission shaft 2 is the drive output shaft, the pressure device is effective and leads with the aid of the control edge 159 to the pressure medium pressure in the cylinder chamber 138 which generates the requisite torque dependent and ratio dependent pressing force on the cone pulleys 130, 132. This occurs by virtue of the fact that axial displacements, even if only very slight, occur between piston 136 and flange 151 due to the existing elasticities and unavoidable clearances, which displacements, by means of the control edge 159, effect a correspondingly more or less great construction of the outflow of the pressure medium from the cylinder chamber 138 until there is equilibrium between the torque dependent and ratio dependent pressing force generated by the presser device and the pressure prevailing in the cylinder chamber 138. In this arrangement, the presser device on the drive input shaft 3 is bridged over or ineffective so that there the requisite supporting force is delivered exclusively through the pressure medium pressure prevailing in the cylinder chamber 139.

If, in the transmission arrangement of FIG. 13, an exchange of drive input and drive output sides is effected, the above-described operations take place at the other side of the transmission in each case.

The transmission arrangement of FIG. 14 differs from that according to FIG. 13 in that, around the pistons 170 and 171 with the wedge or abutment faces 170a and 171a in the cylinder jacket 172 and 173, there is arranged in each case a further annular piston 174, 175 which bears axially stationarily against the flange 176 and 177, respectively. The annular piston 174, 175 carries a part of the support force reaction generated by the pressure medium pressure in the cylinder chambers 178, 179 so that the presser devices on the drive input and drive output sides are correspondingly relieved.

The annular piston 174, 175 has a venting bore 180, 181 so that the pressure medium can flow away from the control edges 159, 160, the openings forming the part being illustrated exaggerated in size for the sake of clarity.

A transmission arrangement is provided in FIG. 15 wherein transmission shafts 201, 202, rotatably mounted in a gearbox 200 have mounted therein stationary cone pulleys 203 and 204 standing radially opposite to one another and axially displaceable cone pulleys 205 and 206 with a traction means 207 circulating between the pairs of pulleys 203, 205 and 204, 206. The axially displaceable cone pulleys 205 and 206 are formed as cylinder piston units 208, 209 to which pressure medium is supplied separately through conduits 210, 211 from pumps 212, 213, respectively. Balls 214 are axially supported against the cone pulleys 205 and 206 with the balls being arranged in channels 215, 216 of sleeves 217 and 218, respectively, securely arranged on the shafts 201 and 202. The remaining supporting or the balls 214 is effected through support rings 219 and 220 with wedge or abutment faces 219a an 220a which are seated on the forward end of a cylinder 221 and 222, respectively, of a cylinder piston unit with pistons 223 and 224, respectively, fast with the shafts 201, 202.

The cylinders 221, 222 are displaceably guided at their rearward end by an axially extending flange 225, 226, respectively, provided on the shafts 202 and 202. The pressure medium supplied to the cylinder piston units 208 and 209 and to the cylinder chambers 227 and 228 flows away by way of shaft bores 229 and 230 and radial bores 231 and 232. Thrust rings 233 and 234 are axially displaceably guided on the flanges 225 and 226 and adjoining the bores 231 and 232 form control edges 235 and 236 with the flanges 225 and 226 with the openings formed by the control edges 235, 236 being illustrated in exaggerated size for reasons of clarity.

The thrust rings 233, 234 are axially supported through pivot bearings 238, 239 against setting rings 240, 241 which, in turn, engage by way of external threadings 242, 243 with internal threadings 244, 245 of members 246, 247 fixedly mounted in the gearbox 200. The setting rings are provided with external toothing or gear teeth 248, 249 which mesh with a pinion 250 of a setting wheel 251, thereby permitting an adjustment of the transmission ratio.

The cylinders 221, 222 are axially displaceably and liquid-tightly guided at their forward end in the cylinder jacket 254, 255 of the cone pulleys 205 and 206, respectively, with an extension or prolongation 252, 253 directed towards the adjacent cone pulley 205, 206.

The manner of operation of the transmission arrangement of FIG. 15 is as follows.

The transmission ratio adjustment is effected by way of the setting wheel 251, which, through the engagement between pinion 250 and toothings 248 and 249, results in an oppositely directed rotation of the setting rings 240, 241 to displace such rings axially with the aid of the thread engagement 242, 244 and 243, 245. The axially oppositely directed shifting movement of the setting rings 240, 241 is communicated through the pivot bearings 238, 239 to the thrust rings 233, 234 which move the cylinders 221 and 222, respectively, axially forward and rearward, respectively, This movement takes place essentially due to the fact that, at the control edges 235 and 235, the outlet for the pressure medium is further opened and further closed, respectively, until the cylinders 221, 222 following in the movement again bring about a constriction position at the said control edges which produces the equilibrium of forces between the expanding force exerted upon the cone pulleys 205 and 206 by the traction means 207 and pressure medium pressures prevailing in the cylinder chambers 208, 209 and 227, 228 in dependence upon the torque dependent and ratio dependent action of the presser device on the drive input side.

In the transmission arrangement of FIG. 15, an advantage is realized in that the supporting of the cone pulleys 205 and 206 through the presser devices, the cylinders 221 and 222 and the thrust rings 233, 234 is at first also mechanically given for the case where the transmission starts up; i.e., the pressure medium sources 212 and 213 are not yet fully effective since the thrust rings 233, 234 are situated directly beside the cylinders 221 and 222 and can also directly mechanically support the same.

Additionally, the transmission arrangement of FIG. 15 produces an easily moving adjustable supporting of the cone pulleys since the pressing force does not pass to the mechanical setting device.

While I have shown and described several embodiments in accordance with the present invention, it is understood that the same is not limited thereto, but is susceptible of numerous changes, variations and modifications as known to those skilled in the art to which it pertains, and I therefor do not wish to be limited to the details shown and described herein, but intend to cover all such changes, variations and modifications as are encompassed by the scope of the appended claims.

I claim:

1. An infinitely variable cone pulley transmission arrangement which includes a drive input shaft, a drive output shaft, at least a pair of cone pulleys arranged on each shaft, a transmission means circulating between the pairs of pulleys on each shaft, means for connecting each pair of cone pulleys with one another and their associated shaft, means for mounting at least one cone pulley on each shaft for axial displacement relative thereto, a transmission ratio setting means for selectively axially displacing the axially displaceable cone pulleys, and rotary connection means provided at at least one of the pairs of cone pulleys for generating torque dependent and ratio dependent pressing forces between the cone pulleys and the transmission means including a presser device comprising a plurality of pairs of spaced oblique faces of variable gradients lying peripherally opposite one another, rolling means fashioned as ball elements interposed between each of the pairs of oblique faces, an axially mounted support ring arranged on the shaft, said rolling means being supported at least indirectly against an adjacent cone pulley and the support ring, the cone pulley associated with the pressing device is exclusively supported by the presser device, and the presser device is in shape-locking engagement with the ball elements of the rolling means, characterized in that the pairs of oblique faces form channels extending substantially parallel to the axis of the shaft, said channels having an effective oblique face gradient which is modified over the channel length, said ball elements of the rolling means being arranged in said channels so as to be displaceable substantially along the axis of the shaft over the entire transmission ratio, and in that an abutment face means is provided on at least one of the support ring and adjacent cone pulley facing the respective channels for engaging the ball elements of the rolling means.

2. An arrangement according to claim 1, characterized in that the ball elements of the rolling means are exclusively displaceable in their associated channels in accordance with a variation of the transmission ratio in a direction parallel to the axis of the shaft, and in that the channels have an axial length at least corresponding to an axial setting range of the displaceable cone pulley.

3. An arrangement according to claim 2, characterized in that the channels include curve branches for supplying torque dependent and ratio dependent pressing forces, and in that, starting from the curve branches of the channels, the channels have a V-shaped cross-sectional configuration.

4. An arrangement according to claim 2, characterized in that the channels include curve branches for supplying torque dependent and ratio dependent pressing forces, and in that, starting from the curve branches of the channels, the channels have a cross-sectional configuration corresponding to a contour of the rolling means.

5. An arrangement according to claim 2, characterized in that the channels include curve branches for supplying torque dependent and ratio dependent pressing forces, and in that starting from the curve branches of the channels, the channels are widened by further curve branches of a constant gradient defined by a logarithmic relationship, said further curve branches adjoin the first-mentioned curve branches and are effective only during at least one of a starting and overload surge condition of the transmission arrangement.

6. An arrangement according to claim 1, characterized in that bearing means are provided for mounting the support ring at the transmission ratio setting means so as to be axially displaced in response to a displacement of the transmission setting means, said bearing means being interposed between the transmission ratio setting means and a portion of the support ring, the transmission ratio setting means includes a control lever means, means for pivotally mounting the control lever means centrally of the drive input and drive output shafts, and in that means are operatively connected with said control lever means for selectively pivoting said control lever means to obtain a desired transmission ratio setting, a sleeve means is arranged on the shaft at which the presser device is provided, and means are provided for mounting said sleeve means so as to be rotatable with the shaft and axially fixed thereto, the channels being arranged in said sleeve means.

7. An arrangement according to claim 6, characterized in that one of the adjacent pulley or an extension thereof is provided with pockets having one of rectangular U-shaped, rounded U-shaped or V-shaped cross-sectional configuration opening in a direction toward the ball elements of the rolling means and extending in one of a radial or oblique direction, said pockets serving to peripherally entrain the ball elements of the rolling means.

8. An arrangement according to claim 6, characterized in that the abutment face means is provided on the support ring, said abutment face means being formed as pockets having one of a V-shaped, rectangular U-shaped or rounded U-shaped cross-sectional configuration opening toward the ball elements of the rolling means.

9. An arrangement according to claim 6, characterized in that said sleeve means mounting means detachably mounts said sleeve means at the shaft.

10. An arrangement according to claim 1, characterized in that a hollow cylinder is coaxially arranged at the shaft associated with the presser device, the channels are arranged in a bore of the hollow cylinder, a sleeve means is mounted on the shaft associated with the presser device at least in the area of the hollow cylinder, the sleeve means is mounted on the shaft so as to be rotatable therewith and axially fixed with respect thereto, a radially extending flange means is connected with the sleeve means at one axial end thereof, said flange means is connected to an axial end of said hollow cylinder, a plurality of window means are arranged about a circumference of the flange means at positions in alignment with said channels, at least one of the cone pulleys associated with the presser device or support ring is provided with means extending through said window means in the axial direction of the shaft with free ends of said projection means defining the abutment face means for engaging the ball elements of the rolling means, the transmission ratio setting means includes a control lever means, means for pivotally mounting the control lever means centrally of the drive input and drive output shafts, means are operatively connected with said control lever means for selectively pivoting said control lever means to obtain a desired transmission ratio setting, and in that said means for selectively pivoting said control lever means is arranged on a far side of one of the shafts with respect to means for pivotally mounting the control lever means.

11. An arrangement according to claim 1, characterized in that one of the adjacent pulley or an extension thereof is provided with pockets having one of a V-shaped, rectangular U-shaped or rounded U-shaped cross-sectional configuration opening in a direction toward the ball elements of the rolling means and extending in one of a radial or oblique direction, said pockets serving to peripherally entrain the ball elements of the rolling means.

12. An arrangement according to claim 1, characterized in that the abutment face means is provided on the support ring and has a wedge-shaped configuration.

13. An arrangement according to claim 1, characterized in that the abutment face means is provided on the support ring, said abutment face means being formed as pockets having one of a V-shaped, rectangular U-shaped, or rounded U-shaped cross-sectional configuration opening toward the ball elements of the rolling means.

14. An arrangement according to claim 10, characterized in that said means extending through said window means includes a projection means formed on the cone pulley.

15. An arrangement according to claim 14, characterized in that an end face of the projection means in engagement with a ball element of the rolling means has a wedge shape.

16. An arrangement according to claim 14, characterized in that an end face of the projection means in engagement with a ball element of the rolling means has one of a V-shaped, rectangular U-shaped or rounded U-shaped cross-sectional configuration opening toward the ball element of the rolling means.

17. An arrangement according to claim 10, characterized in that said sleeve means mounting means detachably mounts said sleeve means at the shaft.

18. An arrangement according to claim 6, characterized in that a hollow cylinder is coaxially arranged at the shaft associated with the presser device, the channels are arranged in a bore of the hollow cylinder, the abutment face means is provided on the support ring and faces the channels, the ball elements of the rolling means are interposed between the abutment face means and channel provided in the bore of the hollow cylinder, a sleeve means is mounted on the shaft associated with the presser device at least in the area of the hollow cylinder, the sleeve means mounted on the shaft so as to be rotatable therewith and axially fixed with respect thereto, a radially extending flange means is connected to said sleeve means at one axial end thereof, said flange means is connected to an axial end of said hollow cylinder, and in that a plurality of window means are arranged about the circumference of the flange means at positions in alignment with said channels, and in that one of the support ring or the cone pulley associated with the presser device is provided with projection means extending in the axial direction of the shaft with free ends of said projection means defining the abutment face means for engaging the ball elements of the rolling means.

19. An arrangement according to claim 18, characterized in that the abutment face means on the projection means has one of a V-shaped, rectangular U-shaped or rounded U-shaped cross-sectional configuration opening toward the ball elements of the rolling means.

20. An arrangement according to claim 18, characterized in that the abutment face means on the projection means has a wedge-shaped configuration.

21. An arrangement according to claim 1, characterized in that the transmission ratio setting means includes a setting spindle means arranged centrally between the drive input and drive output shaft, two arm means extending radially outwardly from said setting spindle means for respectively supporting two diametrically mutually opposite cone pulleys provided on the respective shafts, said two diametrically opposite cone pulleys being equidistantly displaceable by said setting spindle means and said arm means, one of the remaining cone pulleys is supported by the presser device and the other of the remaining cone pulleys is axially non-displaceably mounted on its associated shaft, anti-friction bearing means are provided for connecting said arm means to said setting spindle means, a gearbox means is provided for housing the transmission arrangement, an axial bearing means supports the support ring at the gearbox means, a sleeve means is arranged on the shaft associated with the presser device so as to be rotatable with the shaft and axially displaceable with respect to thereto, the channels are arranged in the periphery of said sleeve means, and in that the sleeve means includes an axially extending portion extending through the support ring, a third arm means is arranged on said setting spindle means extending radially therefrom, means are provided for connecting said third arm means with a free end of the axially extending portion of the sleeve means so that said third arm means is equidistantly displaceable from said two arm means by said setting spindle means.

22. An arrangement according to claim 21, characterized in that said means for connecting said third arm means comprises a rotary connection means including a radial collar means provided at the free end of said sleeve means, and a slip ring means connected to said third arm means for grasping said collar means in a shape-locking manner.

23. An arrangement according to claim 22, characterized in that the abutment face means is provided on said support ring, said abutment face means having a wedge-shaped configuration.

24. An arrangement according to claim 22, characterized in that the abutment face means is provided on said support ring and the cone pulley, and in that both abutment face means have a wedge-shaped configuration.

25. An arrangement according to claim 1, characterized in that a presser device is arranged on each shaft and is operatively associated with each axially displaceable cone pulley, a hydraulic cylinder piston means is provided for supporting each axially displaceable cone pulley at its associated shaft, each hydraulic cylinder piston means includes a cylinder jacket connected to the respective cone pulley defining a pressure medium chamber means for receiving a pressure medium from a pressure medium source, means are provided for controlling the flow of the pressure medium to the chamber means, said controlling means are operatively connected with the transmission ratio setting means so as to position the axially displaceable cone pulleys in response to a displacement of the transmission ratio setting means at a desired transmission ratio, each of the axially displaceable cone pulleys includes an axially extending hollow cylindrical flange coaxial with their associated shaft and extending through the pressure medium chamber means, a hub means is firmly arranged on the respective shafts in a liquid tight manner at a predetermined spacing from a free end of the hollow cylindrcal flange, said hub means including a face directed toward the free end of the hollow cylindrical flange, the channels are arranged on the periphery of the hollow cylindrical flange, the rolling means are arranged in said channels between the free end of the hollow cylindrical flange and the face of the hub means, each piston of the cylinder piston means includes a hollow cylindrical sleeve means extending in a direction of the axis of the associated shaft on a side of the piston opposite the pressure medium chamber means, said hollow cylindrical sleeve means being displaceably guided by its associated hollow cylindrical flange, the support ring is formed at an area where the hollow cylindrical sleeve means joins the respective piston with such area forming the abutment face means having a wedge-shaped configuration and directed toward the hub means and the channels, the face of the respective hub means is provided on an axially extending extension projecting into said hollow cylindrical sleeve means, a pressure medium outlet means is provided within said hub means extension, and in that a free end of the respective hollow cylindrical sleeve means forms with its associated hub means a control edge communicating with said pressure medium outlet means such that the pressure medium outlet means is increasingly constricted upon an increase in torque.

26. An arrangement according to claim 25, characterized in that an annular second piston is arranged between each piston of the piston cylinder means and cylinder jacket, each of said second pistons being coaxially arranged on their associated shaft and supported axially at a portion of the hub means, and in that an annular space is provided between the respective hollow cylindrical sleeve means and associated second piston, a venting bore is provided in each of said second pistons in communication with the control edge for venting the pressure medium.

27. An arrangement according to claim 1, characterized in that a presser device is arranged on each shaft and is operatively associated with each axially displaceable cone pulley, a hydraulic cylinder piston means is provided at each shaft with a piston of each cylinder piston means being axially displaceable with respect to its associated shaft, a support ring of each presser device being arranged at a front of its associated cylinder of the cylinder piston means, a pressure medium chamber means is provided in each cylinder piston means between the support ring and associated piston, the pressure medium chamber means is in selective communication with a pressure medium source so as to selectively displace the respective pistons, the respective cylinders are provided with an axially extending flange means at a position thereof opposite their associated support ring for displaceably guiding the cylinder along its shaft, a sleeve means is non-displaceably mounted on each shaft for rotation therewith at least in an area of the support rings, the channels are arranged in the periphery of the sleeve means in opposition to the abutment face means of the support ring, the ball elements of the rolling means are interposed in said channel means between the abutment face means and a surface of the adjacent pulley of the respective pairs of cone pulleys, a thrust ring means is arranged on each flange means, means are provided for connecting the respective thrust ring means with the transmission ratio setting means such that a displacement of the transmission ratio setting means results in an axial displacement of the thrust ring means, a control edge means is formed between each flange means and thrust ring means for controlling a relieving of the pressure medium from the pressure medium chamber means, the abutment face means has a wedge-shaped configuration, and in that each axially displaceable cone pulley includes axial projections extending into the associated support ring, the free ends of the projections of each cone pulley defining abutment face means on the cone pulley for engaging the ball elements of the rolling means.

28. An arrangement according to claim 27, characterized in that each axially displaceable cone pulley includes a cylinder jacket means for axially displaceably guiding its associated cylinder, means are provided for sealing the cylinders in the associated cylinder jacket means, each support ring includes an axial projection extending in a direction of the adjacent cone pulley, said axial projections have a smaller diameter than a diameter of the cylinders and are accommodated in said cylinder jacket means.

29. An arrangement according to claim 27, characterized in that the transmission ratio setting means includes a setting ring, means arranged at each shaft, means for supporting each thrust ring means against its associated setting ring means, a shaft means rotatably arranged centrally of the drive input and drive output shafts, each of said setting ring means including a first and second toothed portion, said shaft means including a toothed portion engageable with one of the toothed portions of each of the setting ring means so as to selectively set the desired transmission ratio, and in that a fixed member is arranged in the transmission arrangement in proximity to each setting ring means, each member includes a threaded portion engageable with the other of the toothed portions of the setting ring means.

30. An arrangement according to claim 1, characterized in that the channels include curve branches for supplying torque dependent and ratio dependent pressing forces, and in that, starting from the curve branches of the channels, the channels have a V-shaped cross-sectional configuration.

31. An arrangement according to claim 1, characterized in that the channels include curve branches for supplying torque dependent and ratio dependent pressing forces, and in that, starting from the curve branches of the channels, the channels are widened by further curve branches of a constant gradient defined by a logarithmic relationship, said further curve branches adjoin the first-mentioned curve branches and are effective only during at least one of a starting and overload surge condition of the transmission arrangement.

32. An arrangement according to claim 10, characterized in that one of the adjacent pulley or an extension thereof is provided with pockets having one of a V-shaped, rectangular U-shaped or rounded U-shaped cross-sectional configuration opening in a direction toward the ball elements of the rolling means and extending in one of a radial or oblique direction, said pockets serving to peripherally entrain the ball elements of the rolling means.

33. An arrangement according to claim 10, characterized in that the abutment face means is provided on the support ring, said abutment face means having one of a V-shaped, rectangular U-shaped or rounded U-shaped cross-sectional configuration opening toward the ball elements of the rolling means.

34. An arrangement according to claim 2, characterized in that the transmission ratio setting means includes a setting spindle means arranged centrally between the drive input and drive output shaft, two arm means extending radially outwardly from said setting spindle means for respectively supporting two diametrically mutually opposite cone pulleys provided on the respective shafts, said two diametrically opposite cone pulleys being equidistantly displaceable by said setting spindle means and said arm means, one of the remaining cone pulleys is supported by the presser device and the other of the remaining cone pulleys is axially non-displaceably mounted on its associated shaft, a garbox means is provided for housing the transmission arrangement, an axial bearing means supports the support ring at the gearbox means, a sleeve means is arranged on the shaft associated with the presser device so as to be rotatable with the shaft and axially displaceable with respect thereto, the channels are arranged in a periphery of said sleeve means, the sleeve means includes an axially extending portion extending through the support ring, a third arm means is arranged on said setting spindle means extending radially therefrom, and in that means are provided for connecting said third arm means with a free end of the axially extending portion of the sleeve means so that said third arm means is equidistantly displaceable from said two arm means by said setting spindle means.

35. An arrangement according to claim 34, characterized in that a presser device is arranged on each shaft and is operatively associated with each axially displaceable cone pulley, a hydraulic cylinder piston means is provided for supporting each axially displaceable cone pulley at their associated shaft, each hydraulic cylinder piston means includes a cylinder jacket connected to the respective cone pulley defining a pressure medium chamber means for receiving a pressure medium from a pressure medium source, means are provided for controlling the flow of the pressure medium to the chamber means, and in that said controlling means are operatively connected with the transmission ratio setting means so as to position the axially displaceable cone pulleys in response to a displacement of the transmission ratio setting means at a desired transmission ratio.

36. An arrangement according to claim 35, characterized in that each of the axially displaceable cone pulleys includes an axially extending hollow cylindrical flange coaxial with their associated shaft and extending through the pressure medium chamber means, a hub means is firmly arranged on the respective shafts in a liquid tight manner at a predetermined spacing from a free end of the hollow cylindrical flange, said hub means including a face directed toward the free end of the hollow cylindrical flange, and in that the channels are arranged on the periphery of the hollow cylindrical flange, the rolling means being arranged in said channels between the free end of the hollow cylindrical flange and the face of the hub means.

37. An arrangement according to claim 36, characterized in that each piston of the cylinder piston means includes a hollow cylindrical sleeve means extending in the direction of the axis of the associated shaft on a side of the piston opposite the pressure medium chamber means, said hollow cylindrical sleeve means being displaceably guided by its associated hollow cylindrical flange, and in that the support ring is formed at an area where the hollow cylindrical sleeve means joins the respective piston with such area forming the abutment face means directed toward the hub means and the channels.

38. An arrangement according to claim 37, characterized in that the face of the respective hub means is provided on an axially extending extension projecting into said hollow cylindrical sleeve means, a pressure medium outlet means is provided within said hub means extension, and in that a free end of the respective hollow cylindrical sleeve means forms with its associated hub means a control edge communicating with said pressure medium outlet means such that the pressure medium outlet means is increasingly constricted upon an increase in torque.

39. An arrangement according to claim 2, characterized in that a presser device is arranged on each shaft and is operatively associated with each axially displaceable cone pulley, a hydraulic cylinder piston means is provided at each shaft with a piston of each cylinder piston means being axially displaceable with respect to its associated shaft, a support ring of each presser device being arranged at a front of its associated cylinder of the piston cylinder means, a pressure medium chamber means is provided in each cylinder piston means between the support ring and associated piston, the pressure medium chamber means is in selective communication with a pressure medium source so as to selectively displace the respective pistons, and in that the respective cylinders are provided with an axially extending flange means at a position thereof opposite their associated support ring for displaceably guiding the cylinder along its shaft, a sleeve means is non-displaceably mounted on each shaft for rotation therewith at least in the area of the support rings, the channels are arranged in the periphery of the sleeve means in opposition to the abutment face means of the support ring, and in that the rolling means are interposed in said channel means between the abutment face means and a surface of the adjacent pulley of the respective pairs of cone pulleys.

40. An arrangement according to claim 39, characterized in that a thrust ring means is arranged on each flange means, and in that means are provided for connecting the respective thrust ring means with the transmission ratio setting means such that a displacement of the transmission ratio setting means results in an axial displacement of the thrust ring means.

41. An arrangement according to claim 40, characterized in that a control edge means is formed between each flange means and thrust ring means for controlling a relieving of the pressure medium from the pressure medium chamber means.

42. An arrangement according to claim 41, characterized in that each support ring includes an axial projection extending in the direction of the adjacent cone pulley, said axial projections have a smaller diameter than the diameter of the cylinders and are accommodated in said cylinder jacket means.

43. An arrangement according to claim 41, characterized in that the transmission ratio setting means includes a setting ring means arranged at each shaft, means for supporting each thrust ring means against its associated setting ring means, a shaft means rotatably arranged centrally of the drive input and drive output shafts, each of said setting ring means including a first and second toothed portion, said shaft means including a toothed portion engageable with one of the toothed portions of each of the setting ring means so as to selectively set the desired transmission ratio, and in that a fixed member is arranged in the transmission arrangement in proximity to each setting ring means, each member includes a threaded portion engageable with the other of the toothed portions of the setting ring means.

* * * * *